US012692932B2

(12) United States Patent
Zhang et al.

(10) Patent No.: US 12,692,932 B2
(45) Date of Patent: Jul. 28, 2026

(54) HERRINGBONE GEAR PAIR WITH CONSTANT MESHING CHARACTERISTICS CONSTRUCTED TOOTH PAIR

(71) Applicants: Chongqing University, Chongqing (CN); Chongqing Yisilun Technology Co., Ltd., Chongqing (CN)

(72) Inventors: Luhe Zhang, Chongqing (CN); Wenjun Luo, Chongqing (CN); Chaoyang Li, Chongqing (CN); Yonghong Chen, Chongqing (CN); Changyan Peng, Chongqing (CN); Bingkui Chen, Chongqing (CN)

(73) Assignees: Chongqing University, Chongqing (CN); Chongqing Yisilun Technology Co., Ltd., Chongqing (CN)

( * ) Notice: Subject to any disclaimer, the term of this patent is extended or adjusted under 35 U.S.C. 154(b) by 138 days.

(21) Appl. No.: 18/653,671

(22) Filed: May 2, 2024

(65) Prior Publication Data

US 2024/0401685 A1 Dec. 5, 2024

(30) Foreign Application Priority Data

May 31, 2023 (CN) .......................... 202310633261.6

(51) Int. Cl.
*F16H 55/00* (2006.01)
*F16H 1/08* (2006.01)
(Continued)

(52) U.S. Cl.
CPC .............. *F16H 55/08* (2013.01); *F16H 1/08* (2013.01); *F16H 1/24* (2013.01); *F16H 2055/0893* (2013.01)

(58) Field of Classification Search
CPC ... F16H 55/08; F16H 1/08; F16H 1/24; F16H 57/17; F16H 2055/086; F16H 2055/0866; F16H 2055/0893
See application file for complete search history.

(56) References Cited

U.S. PATENT DOCUMENTS 1,412,889 A * 4/1922 O'Brien .............. F16H 55/0806
74/462
1,461,230 A * 7/1923 Stubbs ................ F16H 55/0853
74/412 R (Continued)

FOREIGN PATENT DOCUMENTS

CN 103939575 A 7/2014
CN 105114542 A 12/2015
CN 105202115 A 12/2015

*Primary Examiner* — Zakaria Elahmadi
(74) *Attorney, Agent, or Firm* — CM Law LLP; Robert C. Klinger

(57) ABSTRACT

Provided is a herringbone gear pair with a constant meshing characteristics constructed tooth pair. The herringbone gear pair with a constructed tooth pair includes a herringbone gear I with a constructed tooth pair and a herringbone gear II with a constructed tooth pair based on conjugate curves. In the present disclosure, normal tooth profile curves of the herringbone gear pair with a constructed tooth pair are continuous combined curves with the same curve shape, which facilitates machining by the same cutter. A common normal at an inflection point or a tangent point of the continuous combined curve passes through a pitch point of the gear pair, and a position of the inflection point or the tangent point can be adjusted according to an actual demand. A contact ratio of the herringbone gear pair with a constructed tooth pair is designed as an integer.

7 Claims, 7 Drawing Sheets

(51) Int. Cl.
F16H 1/24 (2006.01)
F16H 55/08 (2006.01)

(56) References Cited

U.S. PATENT DOCUMENTS

| | | | | |
|---|---|---|---|---|
| 2,059,612 A * | 11/1936 | Schellens | ............ | F16H 55/0806 74/466 |
| 2,311,006 A * | 2/1943 | Trbojevich | .......... | F16H 55/0853 74/459.5 |
| 2,942,491 A * | 6/1960 | Wildhaber | ............. | F16H 1/145 74/459.5 |
| 3,438,279 A * | 4/1969 | Rouverol | ................ | F16H 55/08 74/462 |
| 2009/0062058 A1* | 3/2009 | Kimes | ....................... | F16H 1/28 475/344 |

* cited by examiner

HERRINGBONE GEAR PAIR WITH CONSTANT MESHING CHARACTERISTICS CONSTRUCTED TOOTH PAIR

CROSS REFERENCE TO RELATED APPLICATION

This patent application claims the benefit and priority of Chinese Patent Application No. 202310633261.6, filed with the China National Intellectual Property Administration on May 31, 2023, the disclosure of which is incorporated by reference herein in its entirety as part of the present application.

TECHNICAL FIELD

The present disclosure relates to a herringbone gear pair with a constant meshing characteristics constructed tooth pair that has the same tooth profile of continuous combined curves, and in particular, to a herringbone gear pair with a constructed tooth pair that is formed by a herringbone gear I with a constructed tooth pair and a herringbone gear II with a constructed tooth pair as a pair, and has the same normal tooth profile, a constant curvature radius at a meshing point that tends to infinity, a constant sliding ratio, a constant meshing stiffness, and a constant direction of a meshing force action line.

BACKGROUND

A herringbone gear is a key basic component to achieve movement and power transmission, and is applied in aerospace, industrial automation devices, precision instruments, and other fields. Most of existing herringbone gear pairs are involute gear pairs, which have a large sliding ratio between tooth surfaces, a time-varying meshing stiffness, a time-varying meshing force action line, and other inherent characteristics, leading to limited transmission efficiency, service life and dynamic meshing performance improvement room of the herringbone gear pair.

Patents No. 103939575 A, No. 105202115 A and No. 105114542 A each disclose a point contact meshing gear pair based on conjugate curves. Each gear pair constructed in the above patents includes a convex-tooth gear and a concave-tooth gear, and a pair of gears with concave and convex tooth profiles in the gear pair needs machining by means of different cutters, which increases a manufacturing cost of the gear pair. The concave and convex tooth profiles lead to a limited curvature radius at a meshing point of the gear pair, thereby limiting further improvement of the bearing capacity of the gear pair. With regard to selection of a contact point, tooth surface interference occurs at a pitch point, making it difficult to achieve a zero sliding ratio. During meshing, the contact point moves in a tooth width direction, which leads to a time-varying meshing force. Therefore, there is an urgent need for an innovative tooth profile design based on an existing design theory of gears with spatial conjugate curves, so as to improve meshing performance of gears with a constructed tooth pair for transmission and reduce production and manufacturing costs of herringbone gears with a constructed tooth pair for transmission.

SUMMARY

An objective of the present disclosure is to provide a herringbone gear pair with a constant meshing characteristics constructed tooth pair, to solve the aforementioned problems existing in the prior art. The gear pair technically features low manufacturing cost, high bearing capacity, high transmission efficiency, and low vibration noise.

To achieve the above objective, the present disclosure provides the following technical solutions.

A herringbone gear pair with a constant meshing characteristics constructed tooth pair disclosed according to the present disclosure includes a herringbone gear I with a constructed tooth pair and a herringbone gear II with a constructed tooth pair based on conjugate curves, where a normal tooth profile curve $\Gamma_{s1}$ of the herringbone gear I with a constructed tooth pair and a normal tooth profile curve $\Gamma_{s2}$ of the herringbone gear II with a constructed tooth pair in the herringbone gear pair with a constant meshing characteristics constructed tooth pair are continuous combined curves $\Gamma_L$ with the same curve shape, and the continuous combined curves $\Gamma_L$ include a combined curve $\Gamma_{L1}$ of an odd power function curve and a tangent at an inflection point thereof, a combined curve $\Gamma_{L2}$ of a sine function curve and a tangent at an inflection point thereof, a combined curve $\Gamma_{L3}$ of an epicycloid function curve and a tangent at an inflection point thereof, a combined curve $\Gamma_{L4}$ of an odd power function, a combined curve $\Gamma_{L5}$ of a sine function, or a combined curve $\Gamma_{L6}$ of an epicycloid function; the continuous combined curve is formed by two continuous curves, a connection point of the two continuous curves is an inflection point or a tangent point of the continuous combined curve, and a common normal at the inflection point or the tangent point of the continuous combined curve passes through a pitch point of the herringbone gear pair; and the normal tooth profile curves are swept along given conjugate curves to obtain tooth surfaces of the herringbone gear I with a constructed tooth pair and the herringbone gear II with a constructed tooth pair.

Further, in the herringbone gear pair with a constant meshing characteristics constructed tooth pair, when the continuous combined curve $\Gamma_L$ is the combined curve $\Gamma_{L1}$ of the odd power function curve and the tangent at the inflection point thereof, the continuous combined curve $\Gamma_L$ is formed by an odd power function curve $\Gamma_{L12}$ and a tangent $\Gamma_{L11}$ at an inflection point of the odd power function curve; a rectangular coordinate system is established at the tangent point of the continuous combined curve, and an equation of the combined curve $\Gamma_{L1}$ of the odd power function curve and the tangent at the inflection point thereof is as follows:

$$\begin{cases} \Gamma_{L11}: x_{10} = t, \; y_{10} = 0 \; (t_1 \leq t < 0) \\ \Gamma_{L12}: x_{10} = t, \; y_{10} = At^{2n-1} \; (0 \leq t \leq t_2) \end{cases},$$

where $x_{10}$ and $y_{10}$ are x-axis and y-axis coordinate values of the combined curve in the rectangular coordinate system, respectively; a parameter t is an independent variable of the equation; $t_1$ and $t_2$ are value ranges of the continuous curve; A is a coefficient of the equation; and n is a degree of the independent variable and is a positive integer.

Further, in the herringbone gear pair with a constant meshing characteristics constructed tooth pair, when the continuous combined curve $\Gamma_L$ is the combined curve $\Gamma_{L2}$ of the sine function curve and the tangent at the inflection point thereof, the continuous combined curve $\Gamma_L$ is formed by a sine function curve $\Gamma_{L22}$ and a tangent $\Gamma_{L21}$ at an inflection point of the sine function curve; a rectangular coordinate system is established at the tangent point of the continuous combined curve, and an equation of the combined curve $\Gamma_{L2}$ of the sine function curve and the tangent at the inflection point thereof is as follows:

$$\begin{cases} \Gamma_{L21}: x_{20} = t, \ y_{20} = kt \ (t_1 \le t < 0) \\ \Gamma_{L22}: x_{20} = t, \ y_{20} = A\sin(Bt) \ (0 \le t \le t_2) \end{cases},$$

where $x_{20}$ and $y_{20}$ are x-axis and y-axis coordinate values of the combined curve in the rectangular coordinate system, respectively; a parameter t is an independent variable of the equation; $t_1$ and $t_2$ are value ranges of the continuous curve; k is a slope of the tangent at the inflection point of the sine function curve; and A and B are coefficients of the equation.

Further, in the herringbone gear pair with a constant meshing characteristics constructed tooth pair, when the continuous combined curve $\Gamma_L$ is the combined curve $\Gamma_{L3}$ of the epicycloid function curve and the tangent at the inflection point thereof, the continuous combined curve $\Gamma_L$ is formed by an epicycloid function curve $\Gamma_{L32}$ and a tangent $\Gamma_{L31}$ at an inflection point of the epicycloid function curve; a rectangular coordinate system is established at the tangent point of the continuous combined curve, and an equation of the combined curve $\Gamma_{L3}$ of the epicycloid function curve and the tangent at the inflection point thereof is as follows:

$$\begin{cases} \Gamma_{L31}: x_{30} = t, \ y_{30} = kt \ (t_1 \le t < 0) \\ \Gamma_{L32}: \\ \quad x_{30} = (R+r)\sin t - e\sin((R+r)t/r) \qquad (0 \le t < t_2) \\ \quad x_{30} = (R+r)\cos t - e\cos((R+r)t/r) - (R+r-e) \end{cases},$$

where $x_{30}$ and $y_{30}$ are x-axis and y-axis coordinate values of the combined curve in the rectangular coordinate system, respectively; a parameter t is an independent variable of the equation; $t_1$ and $t_2$ are value ranges of the continuous curve; k is a slope of the tangent at the inflection point of the epicycloid function curve; $R_1$, $r_1$, $R_2$ and $r_2$ are radii of a cycloidal moving circle and fixed circle, respectively; and e is an eccentric distance.

Further, in the herringbone gear pair with a constant meshing characteristics constructed tooth pair, when the continuous combined curve $\Gamma_L$ is the combined curve $\Gamma_{L4}$ of the odd power function, the continuous combined curve $\Gamma_L$ is formed by a first odd power function curve $\Gamma_{L41}$ and a second odd power function curve $\Gamma_{L42}$; a rectangular coordinate system is established at the inflection point of the continuous combined curve, and an equation of the combined curve $\Gamma_{L4}$ of the odd power function is as follows:

$$\begin{cases} \Gamma_{L41}: x_{40} = t, \ y_{40} = At^{2n1-1} \ (t_1 \le t < 0) \\ \Gamma_{L42}: x_{40} = t, \ y_{40} = Bt^{2n2-1} \ (0 \le t \le t_2) \end{cases},$$

where $x_{40}$ and $y_{40}$ are x-axis and y-axis coordinate values of the combined curve in the rectangular coordinate system, respectively; a parameter t is an independent variable of the equation; $t_1$ and $t_2$ are value ranges of the continuous curve; A and B are coefficients of the equation; and n1 and n2 are degrees of the independent variable and are positive integers.

Further, in the herringbone gear pair with a constant meshing characteristics constructed tooth pair, when the continuous combined curve $\Gamma_L$ is the combined curve $\Gamma_{L5}$ of the sine function, the continuous combined curve $\Gamma_L$ is formed by a first sine function curve $\Gamma_{L51}$ and a second sine function curve $\Gamma_{L52}$; a rectangular coordinate system is established at the inflection point of the continuous combined curve, and an equation of the combined curve $\Gamma_{L5}$ of the sine function is as follows:

$$\begin{cases} \Gamma_{L51}: x_{50} = t, \ y_{50} = A_1\sin(B_1 t) \ (t_1 \le t < 0) \\ \Gamma_{L52}: x_{50} = t, \ y_{50} = A_2\sin(B_2 t) \ (0 \le t \le t_2) \end{cases},$$

where $x_{50}$ and $y_{50}$ are x-axis and y-axis coordinate values of the combined curve in the rectangular coordinate system, respectively; a parameter t is an independent variable of the equation; $t_1$ and $12$ are value ranges of the continuous curve; and $A_1$, $B_1$, $A_2$ and $B_2$ are coefficients of the equation.

Further, in the herringbone gear pair with a constant meshing characteristics constructed tooth pair, when the continuous combined curve $\Gamma_L$ is the combined curve $\Gamma_{L6}$ of the epicycloid function, the continuous combined curve $\Gamma_L$ is formed by a first epicycloid function curve $\Gamma_{L61}$ and a second epicycloid function curve $\Gamma_{L62}$; a rectangular coordinate system is established at the inflection point of the continuous combined curve, and an equation of the combined curve $\Gamma_{L6}$ of the epicycloid function is as follows:

$$\begin{cases} \Gamma_{L61}: \\ \quad x_{60} = -(R_1+r_1)\sin t + e\sin((R_1+r_1)t/r_1) \qquad (t_1 \le t < 0) \\ \quad y_{60} = -(R_1+r_1)\cos t + e\cos((R_1+r_1)t/r_1) + (R_1+r_1-e) \\ \Gamma_{L62}: \\ \quad x_{60} = (R_2+r_2)\sin t - e\sin((R_2+r_2)t/r_2) \qquad (0 \le t < t_2) \\ \quad y_{60} = (R_2+r_2)\cos t - e\cos((R_2+r_2)t/r_2) - (R_2+r_2-e) \end{cases},$$

where a parameter t is an independent variable of the equation; $t_1$ and $t_2$ are value ranges of the continuous curves; $R_1$ and $r_1$ are radii of a first epicycloid moving circle and fixed circle, respectively, and $R_2$ and $r_2$ are radii of a second epicycloid moving circle and fixed circle, respectively; e is an eccentric distance; and $x_{60}$ and $y_{60}$ are x-axis and y-axis coordinate values of the combined curve in the rectangular coordinate system, respectively.

Further, in the herringbone gear pair with a constant meshing characteristics constructed tooth pair, a curve equation of the normal tooth profile curve $\Gamma_{s1}$ of the herringbone gear I with a constructed tooth pair obtained by rotating the continuous combined curve $\Gamma_L$ around an origin of the rectangular coordinate system by an angle $\alpha_1$ is as follows:

$$\begin{cases} x_{01} = x_{n0}\cos\alpha_1 - y_{n0}\sin\alpha_1 \\ y_{01} = x_{n0}\sin\alpha_1 + y_{n0}\cos\alpha_1 \end{cases} (n = 1, 2, 3, 4, 5, 6),$$

where $x_{01}$ and $y_{01}$ are x-axis and y-axis coordinate values of the normal tooth profile curve of the herringbone gear I with a constructed tooth pair in the rectangular coordinate system, respectively.

Further, in the herringbone gear pair with a constant meshing characteristics constructed tooth pair, a curve equation of the normal tooth profile curve $\Gamma_{s2}$ of the herringbone gear II with a constructed tooth pair obtained by rotating the normal tooth profile curve $\Gamma_{s1}$ of the herringbone gear I with a constructed tooth pair around the origin of the rectangular coordinate system by an angle of 180° is as follows:

$$\begin{cases} x_{02} = x_{01} \cos(180°) - y_{01} \sin(180°) \\ y_{02} = x_{01} \sin(180°) + y_{01} \cos(180°) \end{cases},$$

where $x_{02}$ and $y_{02}$ are x-axis and y-axis coordinate values of the normal tooth profile curve of the herringbone gear II with a constructed tooth pair in the rectangular coordinate system, respectively.

Further, in the herringbone gear pair with a constant meshing characteristics constructed tooth pair, a tooth surface $\Sigma_1$ of the herringbone gear I with a constructed tooth pair is obtained by sweeping the normal tooth profile curve $\Gamma_{s1}$ of the herringbone gear I with a constructed tooth pair along a given helix, with a tooth surface equation as follows:

$$\begin{cases} x_{\Sigma1} = x_{01} + m \tan\beta \\ y_1 = y_{01} \qquad (m_1 \le m \le m_2), \\ z_{\Sigma1} = \pm m \end{cases}$$

where $x_{\Sigma1}$, $y_{\Sigma1}$ and $z_{\Sigma1}$ are coordinate values of the tooth surface of the herringbone gear I with a constructed tooth pair, respectively; $\beta$ is a helix angle of the gear pair, a parameter m is an independent variable of the equation, and $m_1$ and $m_2$ are value ranges of a tooth width; in the sign "±", the sign "+" indicates a left tooth surface of the herringbone gear with a constructed tooth pair, and the sign "−" indicates a right tooth surface of the herringbone gear with a constructed tooth pair.

Further, in the herringbone gear pair with a constant meshing characteristics constructed tooth pair, a tooth surface $\Sigma_2$ of the herringbone gear II with a constructed tooth pair is obtained by sweeping the normal tooth profile curve $\Gamma_{s2}$ of the herringbone gear II with a constructed tooth pair along a given helix, with a tooth surface equation as follows:

$$\begin{cases} x_{\Sigma2} = x_{02} \cos\theta - y_{02} \cos\beta \sin\theta + (a-r)\cos\theta \\ y_{\Sigma2} = x_{02} \sin\theta + y_{02} \cos\beta \cos\theta + (a-r)\sin\theta, \\ z_{\Sigma2} = \pm(r\theta \cot\beta - y_{02}\sin\beta) \end{cases}$$

where $x_{\Sigma2}$, $y_{\Sigma2}$ and $z_{\Sigma2}$ are coordinate values of the tooth surface of the herringbone gear II with a constructed tooth pair, respectively; r is a pitch radius of the herringbone gear pair with a constant meshing characteristics constructed tooth pair, and $\theta$ is an angle of a given contact line; in the sign "±", the sign "+" indicates a left tooth surface of the herringbone gear with a constructed tooth pair, and the sign "−" indicates a right tooth surface of the herringbone gear with a constructed tooth pair.

Further, in the herringbone gear pair with a constant meshing characteristics constructed tooth pair, a contact ratio of the herringbone gear pair with a constant meshing characteristics constructed tooth pair is designed as an integer, thereby achieving meshing transmission with a constant stiffness.

Further, in the herringbone gear pair with a constant meshing characteristics constructed tooth pair, the herringbone gear I with a constructed tooth pair and the herringbone gear II with a constructed tooth pair are designed to be symmetrical along the tooth width, thereby achieving a constant meshing force action line of the gear pair.

Compared with the prior art, the present disclosure has the following technical effects:

In the herringbone gear pair with a constant meshing characteristics constructed tooth pair according to the present disclosure, a herringbone gear I with a constructed tooth pair and a herringbone gear II with a constructed tooth pair have the same normal tooth profile, and can be machined by using the same cutter, thus reducing a manufacturing cost. A curvature radius at a meshing point is constant and tends to infinity, which improves the overall bearing capacity. A sliding ratio during meshing is constant and may be designed as a zero sliding ratio, which improves overall transmission efficiency and reduces wear during transmission. The herringbone gear I with a constructed tooth pair and the herringbone gear II with a constructed tooth pair are designed to be symmetrical along a tooth width, which can achieve a constant meshing force action line. A contact ratio of the herringbone gear pair with a constant meshing characteristics constructed tooth pair is designed as an integer, which can achieve a constant meshing stiffness, thus greatly reducing vibration noise of the herringbone gear pair with a constant meshing characteristics constructed tooth pair.

BRIEF DESCRIPTION OF THE DRAWINGS

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

In the figures: 1—Herringbone gear I with a constructed tooth pair, 2—Herringbone gear II with a constructed tooth pair.

DETAILED DESCRIPTION OF THE EMBODIMENTS

The technical solutions of the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a herringbone gear pair with a constant meshing characteristics constructed tooth pair, to solve the technical problems in the prior art that gears in a gear pair need machining by means of different cutters and have high manufacturing costs, high vibration noise and low transmission efficiency.

In order to make the above objective, features and advantages of the present disclosure clearer and more comprehensible, the present disclosure will be further described in detail below in combination with accompanying drawings and specific implementations.

As shown in FIGS. 1 to 8, this embodiment provides a herringbone gear pair with a constant meshing characteristics constructed tooth pair, with basic parameters as follows: Module m=8, number of teeth of a gear I with a constructed tooth pair: $z_1$=20, number of teeth of a gear II with a constructed tooth pair: $z_2$=85, addendum coefficient $h_a^*$=0.5, tip clearance coefficient c*=0.2, addendum $h_a$=4 mm, dedendum $h_f$=5.6 mm, helix angle β=35°, and tooth width w=80 mm.

Figure 1:
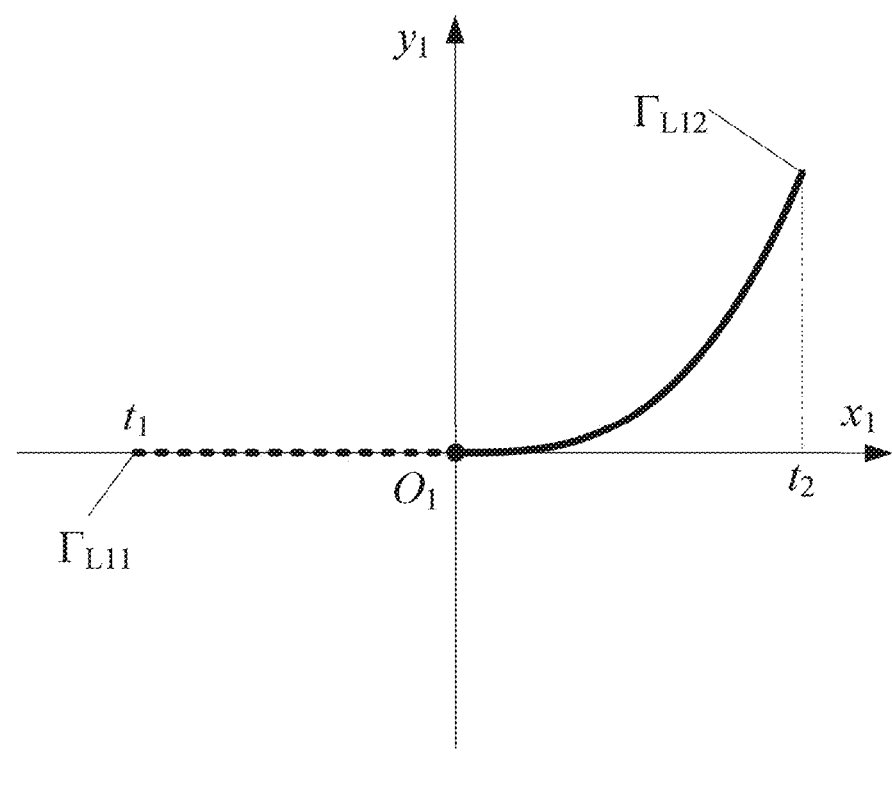
FIG. 1 is a schematic diagram of a combined curve of an odd power function curve and a tangent at an inflection point thereof according to the present disclosure.

Taking a combined curve of an odd power function curve and a tangent at an inflection point thereof as a normal tooth profile as an example, FIG. 1 is a schematic diagram of a combined curve of an odd power function curve and a tangent at an inflection point thereof according to this embodiment. A local plane rectangular coordinate system $\sigma_1(O_1-x_1,y_1)$ is established at the inflection point of the continuous curve, with a coefficient A=1.2 and n=2, and an equation of a combined curve $\Gamma_{L1}$ (formed by an odd power function curve $\Gamma_{L12}$ and a tangent $\Gamma_{L11}$ at an inflection point of the odd power function curve) of an odd power function curve and a tangent at an inflection point thereof is as follows:

$$\begin{cases} \Gamma_{L11}: x_{10} = t, \, y_{10} = 0 & (t_1 \leq t < 0) \\ \Gamma_{L21}: x_{10} = t, \, y_{10} = 1.2t^3 & (0 \leq t \leq t_2) \end{cases},$$

where $x_{10}$ and $y_{10}$ are x-axis and y-axis coordinate values of the combined curve in the rectangular coordinate system $\sigma_1$, respectively; a parameter t is an independent variable of the equation; and $t_1$ and $t_2$ are value ranges of the continuous curve.

Figure 2:
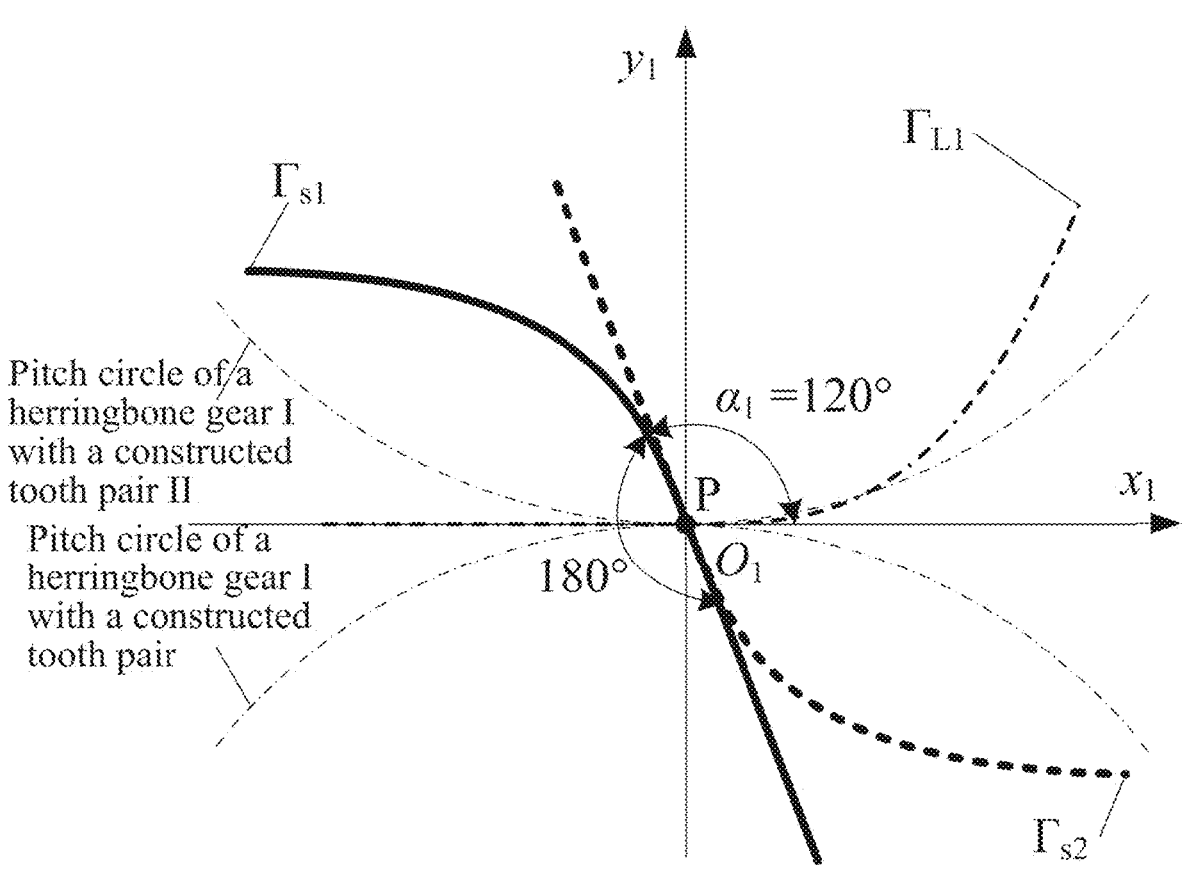
FIG. 2 is a schematic diagram illustrating formation of a normal tooth profile of a herringbone gear pair with a constant meshing characteristics constructed tooth pair having a combined curve of an odd power function curve and a tangent at an inflection point thereof as a tooth profile curve according to the present disclosure.

FIG. 2 is a schematic diagram illustrating formation of a normal tooth profile of a herringbone gear pair with a constant meshing characteristics constructed tooth pair having a combined curve of an odd power function curve and a tangent at an inflection point thereof as a tooth profile curve according to this embodiment. An inflection point P is a meshing point. When the continuous combined curve $\Gamma_L$ rotates around an origin of the rectangular coordinate system by an angle $\alpha_1$ to obtain a normal tooth profile curve $\Gamma_{s1}$ of a sun gear with a constructed tooth pair, the value of the rotation angle $\alpha_1$ needs to be determined according to specific parameters of the gear pair, with a general value range as follows: $0° < \alpha_1 < 180°$. A specific formation process and a tooth profile curve equation of the normal tooth profile of the herringbone gear pair with a constant meshing characteristics constructed tooth pair are as follows:

The combined curve $\Gamma_{L1}$ of the odd power function curve and the tangent at the inflection point thereof rotates around the rectangular coordinate system σ1 by an angle of $\alpha_1$=120° to obtain the normal tooth profile curve $\Gamma_{s1}$ of the herringbone gear I 1 with a constructed tooth pair, with a curve equation as follows:

$$\begin{cases} x_{01} = x_{10}\cos(120°) - y_{10}\sin(120°) \\ y_{01} = x_{10}\sin(120°) + y_{10}\cos(120°) \end{cases},$$

where $x_{01}$ and $y_{01}$ are x-axis and y-axis coordinate values of the normal tooth profile curve of the herringbone gear I 1 with a constructed tooth pair in the rectangular coordinate system $\sigma_1$, respectively.

A normal tooth profile curve $\Gamma_{s2}$ of the herringbone gear II 2 with a constructed tooth pair is obtained by rotating the normal tooth profile curve $\Gamma_{s1}$ of the herringbone gear I 1 with a constructed tooth pair around the origin of the rectangular coordinate system $\sigma_1$ by an angle of 180°, with a curve equation as follows:

$$\begin{cases} x_{02} = x_{01} \cos(180°) - y_{01} \sin(180°) \\ y_{02} = x_{01} \sin(180°) + y_{01} \cos(180°) \end{cases},$$

where $x_{02}$ and $y_{02}$ are x-axis and y-axis coordinate values of the normal tooth profile curve of the herringbone gear II 2 with a constructed tooth pair in the rectangular coordinate system $\sigma_1$, respectively.

Figure 3:
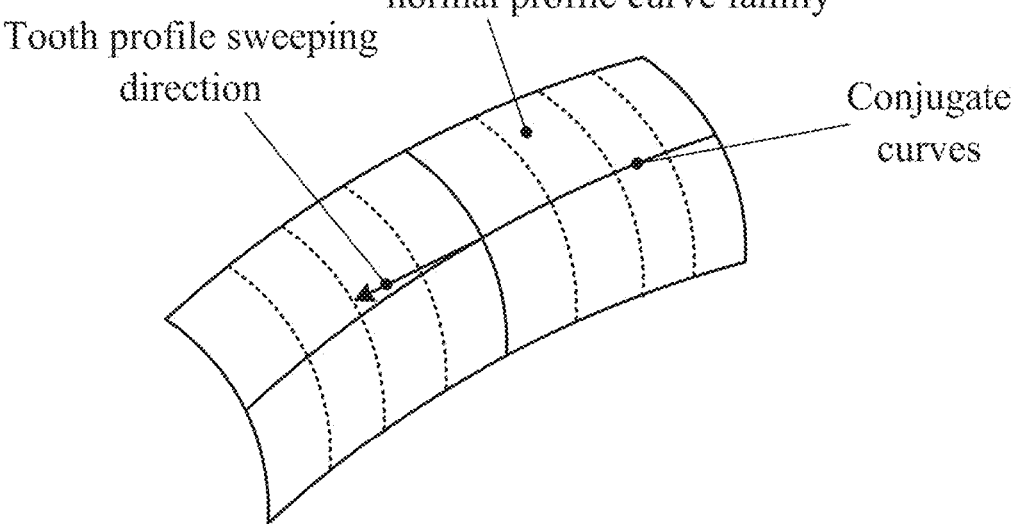
FIG. 3 is a schematic diagram illustrating construction of a tooth surface of a herringbone gear pair with a constant meshing characteristics constructed tooth pair having a combined curve of an odd power function curve and a tangent at an inflection point thereof as a tooth profile curve according to the present disclosure.

FIG. 3 is a schematic diagram illustrating construction of a tooth surface of a herringbone gear pair with a constant meshing characteristics constructed tooth pair having a combined curve of an odd power function curve and a tangent at an inflection point thereof as a tooth profile curve according to this embodiment. A specific construction process and a tooth surface equation of the tooth surface of the herringbone gear pair with a constant meshing characteristics constructed tooth pair are as follows:

A tooth surface $\Sigma_1$ of the herringbone gear I 1 with a constructed tooth pair is obtained by sweeping the normal tooth profile curve $\Gamma_{s1}$ of the herringbone gear I 1 with a constructed tooth pair along a given helix, with a tooth surface equation as follows:

$$\begin{cases} x_{\Sigma 1} = x_{01} + 0.268m \\ y_{\Sigma 1} = y_{01} & (m_1 \leq m \leq m_2), \\ z_{\Sigma 1} = \pm m \end{cases}$$

9 where $x_{\Sigma1}$, $y_{\Sigma1}$ and $z_{\Sigma1}$ are coordinate values of the tooth surface of the herringbone gear I 1 with a constructed tooth pair, respectively; a parameter m is an independent variable of the equation, and $m_1$ and $m_2$ are value ranges of a tooth width; in the sign "±", the sign "+" indicates a left tooth surface of the herringbone gear with a constructed tooth pair, and the sign "−" indicates a right tooth surface of the herringbone gear with a constructed tooth pair.

Similarly, a tooth surface $\Sigma_2$ of the herringbone gear II 2 with a constructed tooth pair is obtained by sweeping the normal tooth profile curve $\Gamma_{s2}$ of the herringbone gear II 2 with a constructed tooth pair along a given helix, with a tooth surface equation as follows:

$$\begin{cases} x_2 = (x_{02} + 80)\cos\theta - 0.966x_{02}\sin\theta \\ y_2 = (x_{02} + 80)\sin\theta + 0.966y_{02}\cos\theta \\ z_2 = \pm(298.564\theta - 0.259y_{02}) \end{cases},$$

where $x_{\Sigma2}$, $y_{\Sigma2}$ and $z_{\Sigma2}$ are coordinate values of the tooth surface of the herringbone gear II 2 with a constructed tooth pair, respectively; $\theta$ is an angle of a given contact line; in the sign "±", the sign "+" indicates a left tooth surface of the herringbone gear with a constructed tooth pair, and the sign "−" indicates a right tooth surface of the herringbone gear with a constructed tooth pair.

Figure 4:
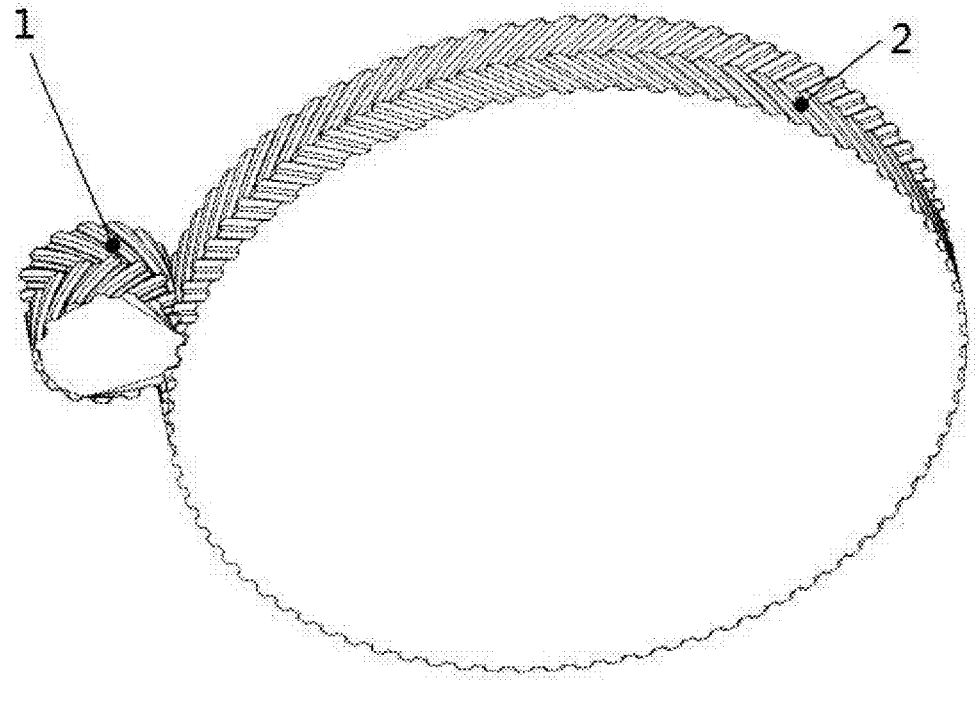
FIG. 4 is a schematic entity diagram of a herringbone gear pair with a constant meshing characteristics constructed tooth pair having a combined curve of an odd power function curve and a tangent at an inflection point thereof as a tooth profile curve according to the present disclosure.

FIG. 4 is a schematic entity diagram of a herringbone gear pair with a constant meshing characteristics constructed tooth pair having a combined curve of an odd power function curve and a tangent at an inflection point thereof as a tooth profile curve according to this embodiment. An entity model of the herringbone gear pair with a constant meshing characteristics constructed tooth pair having the same tooth profile of continuous combined curves is obtained by defining dimensions of addendum circles and dedendum circles of the herringbone gear I 1 with a constructed tooth pair and the herringbone gear II 2 with a constructed tooth pair, and performing trimming, stitching, rounding, and other operations on the tooth surfaces.

In this embodiment, the normal tooth profile curves of the herringbone gear I 1 with a constructed tooth pair and the herringbone gear II 2 with a constructed tooth pair each may alternatively be a combined curve $\Gamma_{L2}$ of a sine function curve and a tangent at an inflection point thereof, a combined curve $\Gamma_{L3}$ of an epicycloid function curve and a tangent at an inflection point thereof, a combined curve $\Gamma_{L4}$ of an odd power function, a combined curve $\Gamma_{L5}$ of a sine function, or a combined curve $\Gamma_{L6}$ of an epicycloid function, with a curve equation as follows.

When the continuous combined curve $\Gamma_L$ is the combined curve $\Gamma_{L2}$ of the sine function curve and the tangent at the inflection point thereof, the continuous combined curve $\Gamma_{L2}$ is formed by a sine function curve $\Gamma_{L22}$ and a tangent $\Gamma_{L21}$ at an inflection point of the sine function curve; a rectangular coordinate system is established at the tangent point of the continuous combined curve, and an equation of the combined curve $\Gamma_{L2}$ of the sine function curve and the tangent at the inflection point thereof is as follows:

$$\begin{cases} \Gamma_{L21} : x_{20} = t, y_{20} = kt & (t_1 \le t < 0) \\ \Gamma_{L22} : x_{20} = t, y_{20} = A\sin(Bt) & (0 \le t \le t_2) \end{cases},$$

where $x_{20}$ and $y_{20}$ are x-axis and y-axis coordinate values of the combined curve in the rectangular coordinate system, respectively; a parameter t is an independent variable of the equation; $t_1$ and $t_2$ are value ranges of the continuous curve; k is a slope of the tangent at the inflection point of the sine function curve; and A and B are coefficients of the equation.

When the continuous combined curve $\Gamma_L$ is the combined curve $\Gamma_{L3}$ of the epicycloid function curve and the tangent at the inflection point thereof, the continuous combined curve $\Gamma_{L3}$ is formed by an epicycloid function curve $\Gamma_{L32}$ and a tangent $\Gamma_{L31}$ at an inflection point of the epicycloid function curve; a rectangular coordinate system is established at the tangent point of the continuous combined curve, and an equation of the combined curve $\Gamma_{L3}$ of the epicycloid function curve and the tangent at the inflection point thereof is as follows:

$$\begin{cases} \Gamma_{L31} : x_{30} = t, y_{30} = kt & (t_1 \le t < 0) \\ \Gamma_{L32} : x_{30} = (R+r)\sin t - e\sin((R+r)t/r) & (0 \le t \le t_2) \\ \qquad y_{30} = (R+r)\cos t - e\cos((R+r)t/r) - (R+r-e) \end{cases},$$

where $x_{30}$ and $y_{30}$ are x-axis and y-axis coordinate values of the combined curve in the rectangular coordinate system, respectively; a parameter t is an independent variable of the equation; $t_1$ and $t_2$ are value ranges of the continuous curve; k is a slope of the tangent at the inflection point of the epicycloid function curve; $R_1$, $r_1$, $R_2$ and $r_2$ are radii of a cycloidal moving circle and fixed circle, respectively; and e is an eccentric distance.

When the continuous combined curve $\Gamma_L$ is the combined curve $\Gamma_{L4}$ of the odd power function, the continuous combined curve $\Gamma_{L4}$ is formed by an odd power function curve $\Gamma_{L41}$ and a second odd power function curve $\Gamma_{L42}$; a rectangular coordinate system is established at the inflection point of the continuous combined curve, and an equation of the combined curve $\Gamma_{L4}$ of the odd power function is as follows:

$$\begin{cases} \Gamma_{L41} : x_{40} = t, y_{40} = At^{2n1-1} & (t_1 \le t < 0) \\ \Gamma_{L42} : x_{40} = t, y_{40} = Bt^{2n2-1} & (0 \le t \le t_2) \end{cases},$$

where $x_{40}$ and $y_{40}$ are x-axis and y-axis coordinate values of the combined curve in the rectangular coordinate system, respectively; a parameter t is an independent variable of the equation; $t_1$ and $t_2$ are value ranges of the continuous curve; A and B are coefficients of the equation; and n1 and n2 are degrees of the independent variable and are positive integers.

When the continuous combined curve $\Gamma_L$ is the combined curve $\Gamma_{L5}$ of the sine function, the continuous combined curve $\Gamma_{L5}$ is formed by a sine function curve $\Gamma_{L51}$ and a second sine function curve $\Gamma_{L52}$; a rectangular coordinate system is established at the inflection point of the continuous combined curve, and an equation of the combined curve $\Gamma_{L5}$ is of the sine function is as follows:

$$\begin{cases} \Gamma_{L51} : x_{50} = t, y_{50} = A_1\sin(B_1t) & (t_1 \le t < 0) \\ \Gamma_{L52} : x_{50} = t, y_{50} = A_2\sin(B_2t) & (0 \le t \le t_2) \end{cases},$$

where $x_{50}$ and $y_{50}$ are x-axis and y-axis coordinate values of the combined curve in the rectangular coordinate system, respectively; a parameter t is an independent variable of the equation; $t_1$ and $t_2$ are value ranges of the continuous curve; and $A_1$, $B_1$, $A_2$ and $B_2$ are coefficients of the equation.

When the continuous combined curve $\Gamma_L$ is the combined curve $\Gamma_{L6}$ of the epicycloid function, the continuous combined curve $\Gamma_{L6}$ is formed by an epicycloid function curve $\Gamma_{L61}$ and a second epicycloid function curve $\Gamma_{L62}$; a rectangular coordinate system is established at the inflection point of the continuous combined curve, and an equation of the combined curve $\Gamma_{L6}$ of the epicycloid function is as follows:

$$\begin{cases} \Gamma_{L61}: x_{60} = -(R_1 + r_1)\sin t + e\sin((R_1 + r_1)t/r_1) & (t_1 \le t < 0) \\ \quad y_{60} = -(R_1 + r_1)\cos t + e\cos((R_1 + r_1)t/r_1) + \\ \quad\quad (R_1 + r_1 - e) \\ \Gamma_{L62}: x_{60} = (R_2 + r_2)\sin t - e\sin((R_2 + r_2)t/r_2) & (0 \le t < t_2) \\ \quad y_{60} = (R_2 + r_2)\cos t - e\cos((R_2 + r_2)t/r_2) - \\ \quad\quad (R_2 + r_2 - e) \end{cases},$$

where a parameter t is an independent variable of the equation; $t_1$ and $t_2$ are value ranges of the continuous curves; $R_1$ and $r_1$ are radii of a first epicycloid moving circle and fixed circle, respectively, and $R_2$ and $r_2$ are radii of a second epicycloid moving circle and fixed circle, respectively; e is an eccentric distance; and $x_{60}$ and $y_{60}$ are x-axis and y-axis coordinate values of the combined curve in the rectangular coordinate system, respectively.

In the herringbone gear pair with a constant meshing characteristics constructed tooth pair disclosed according to the embodiment of the present disclosure, normal tooth profile curves of the herringbone gear I 1 with a constructed tooth pair and the herringbone gear II 2 with a constructed tooth pair are continuous combined curves with the same curve shape, and a meshing point of the herringbone gear I 1 with a constructed tooth pair and the herringbone gear II 2 with a constructed tooth pair is at an inflection point or a tangent point of the continuous combined curve.

In this embodiment, the inflection point or the tangent point of the continuous combined curve is as follows:

1. When the continuous combined curve is a combined curve of an odd power function, a combined curve of a sine function or a combined curve of an epicycloid function, a connection point of the continuous combined curve is an inflection point, that is, a concave-convex boundary point of the curve, a second derivative of the curve is zero at this point, and second order derivative signs near two sides of this point are opposite;

2. when the combined curve is a combined curve of an odd power function curve and a tangent at an inflection point thereof, a combined curve of a sine function curve and a tangent at an inflection point thereof, or a combined curve of an epicycloid and a tangent at an inflection point thereof, a connection point of the combined curve is an inflection point of the odd power function curve, the sine function curve or the epicycloid (meaning the same as 1), which is also a tangent point of the odd power function curve, the sine function curve or the epicycloid at the tangent.

At the inflection point or the tangent point of the continuous combined curve, the curvature is zero, and the curvature radius tends to infinity. When the continuous combined curve is the combined curve of the odd power function, the combined curve of the sine function, or the combined curve of the epicycloid function, the curvature radii on two sides of the inflection point tend to infinity; or when the continuous combined curve is the combined curve of the odd power function curve and the tangent at the inflection point thereof, the curvature radius on the side of the odd power function curve tends to infinity, and the curvature radius on the side of the tangent is infinite.

Figure 5:
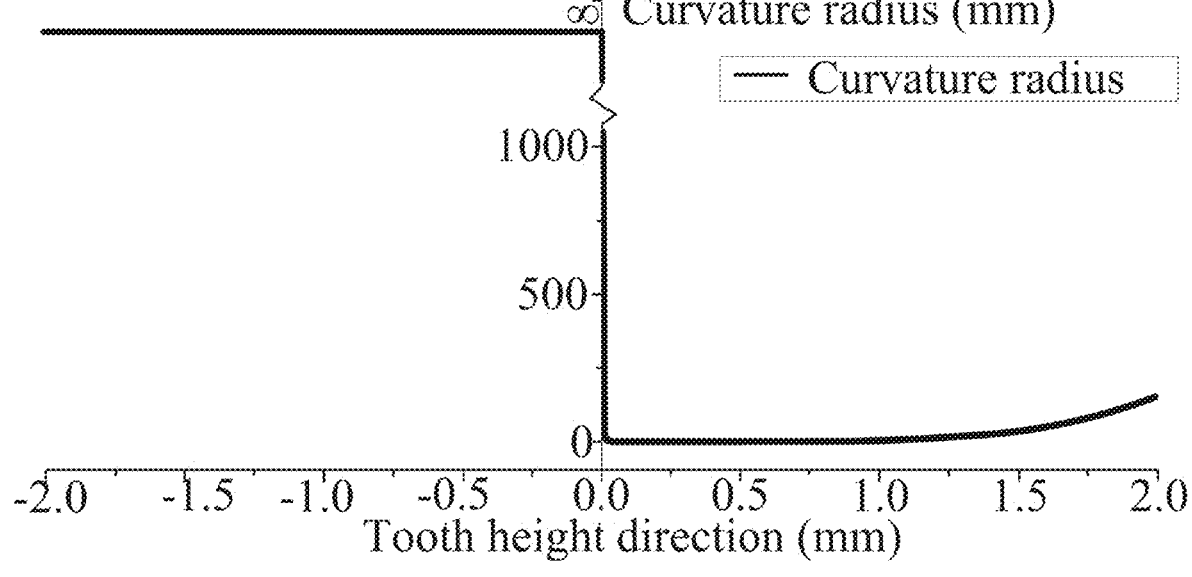
FIG. 5 is a schematic diagram illustrating a curvature radius at a meshing point of a herringbone gear pair with a constant meshing characteristics constructed tooth pair having a combined curve of an odd power function curve and a tangent at an inflection point thereof as a tooth profile curve according to the present disclosure.

The curvature radius of the combined curve is calculated based on given parameters in the embodiment, as shown in FIG. 5. The curvature radius of a straight line segment in the combined curve in FIG. 5 is infinite, the curvature radius at the inflection point tends to infinity, and the curvature radius of the cubic power function curve segment gradually decreases and then increases, but is still far less than the curvature radius at the inflection point. This means that the curvature radius at a contact point of the gear pair with a constructed tooth pair tends to infinity, which improves the bearing capacity of the gear pair with a constructed tooth pair.

Figure 6:
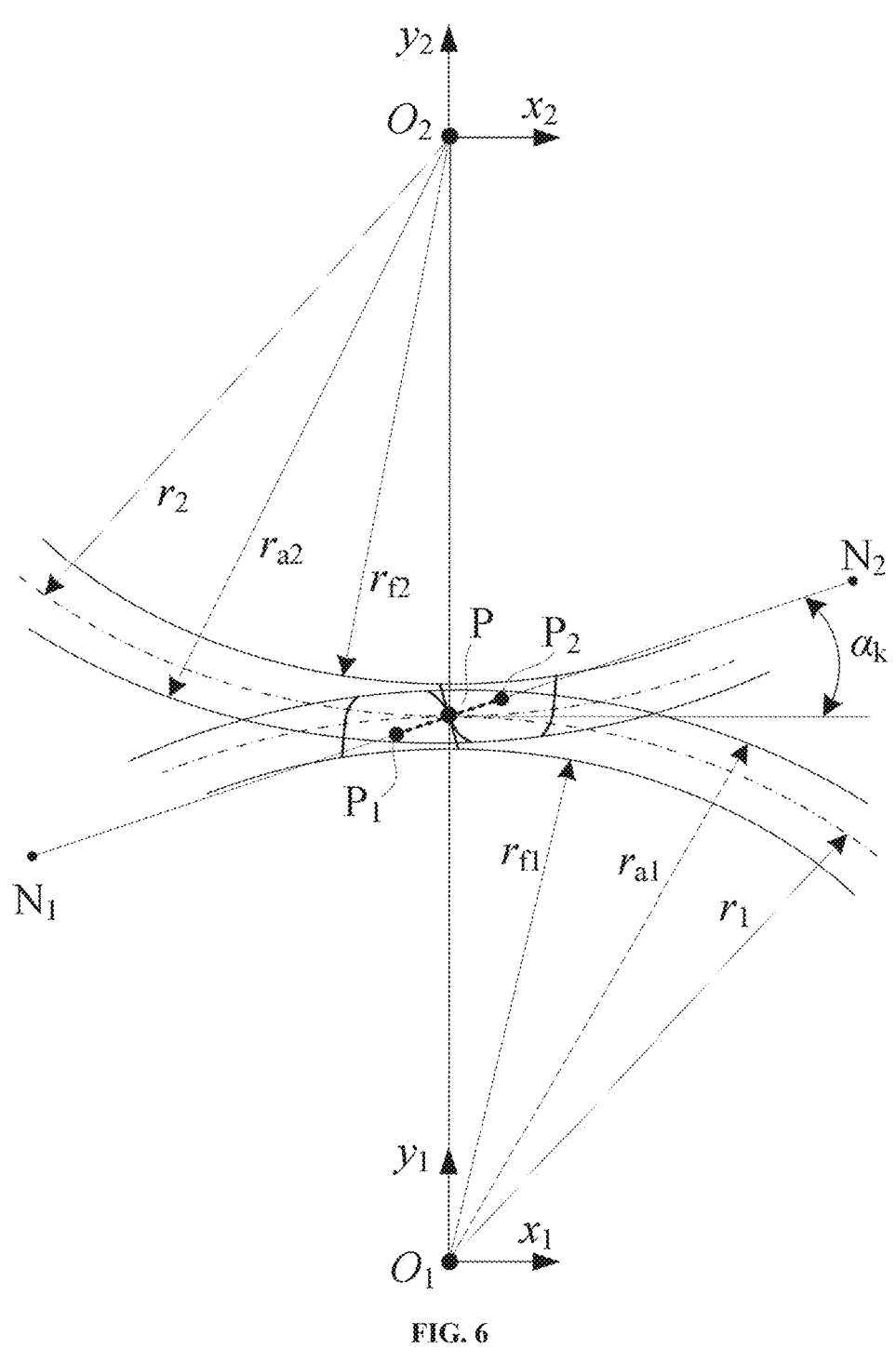
FIG. 6 is a schematic diagram of a designated point on a meshing force action line of a herringbone gear pair with a constant meshing characteristics constructed tooth pair according to the present disclosure.

In this embodiment, the inflection point or the tangent point of the continuous combined curve is a designated point located on a meshing force action line of the gear pair. The designated point is specifically defined as a given point at a pitch point or near the pitch point on the meshing force action line of the herringbone gear pair with a constant meshing characteristics constructed tooth pair that is a straight line which forms a certain angle (pressure angle) with a horizontal axis by means of the pitch point. FIG. 6 is a schematic diagram of a designated point on a meshing force action line of a herringbone gear pair with a constant meshing characteristics constructed tooth pair. In the figure, P is the designated point on the meshing force action line of the gear pair; $P_1$ and $P_2$ are limit points of the position range of the designated point; the straight line $N_1N_2$ is the meshing force action line of the gear pair; $\alpha_k$ is a pressure angle; $O_1$ is a central point of the herringbone gear II 2 with a constructed tooth pair, and $O_1-x_1y_1$ and $O_2-x_2y_2$ are local rectangular coordinate systems of the herringbone gear I 1 with a constructed tooth pair and the herringbone gear II 2 with a constructed tooth pair, respectively; and $r_1$ and $r_2$, $r_{a1}$ and $r_{a2}$, and $r_{f1}$ and $r_{f2}$ are pitch radii, addendum circle radii, and dedendum circle radii of the herringbone gear I 1 with a constructed tooth pair and the herringbone gear II 2 with a constructed tooth pair, respectively. The designated point P is a given point usually located at a pitch point or near either of two sides of the pitch point, and a variation area of the designated point does not exceed a half of a tooth height.

Figure 7:
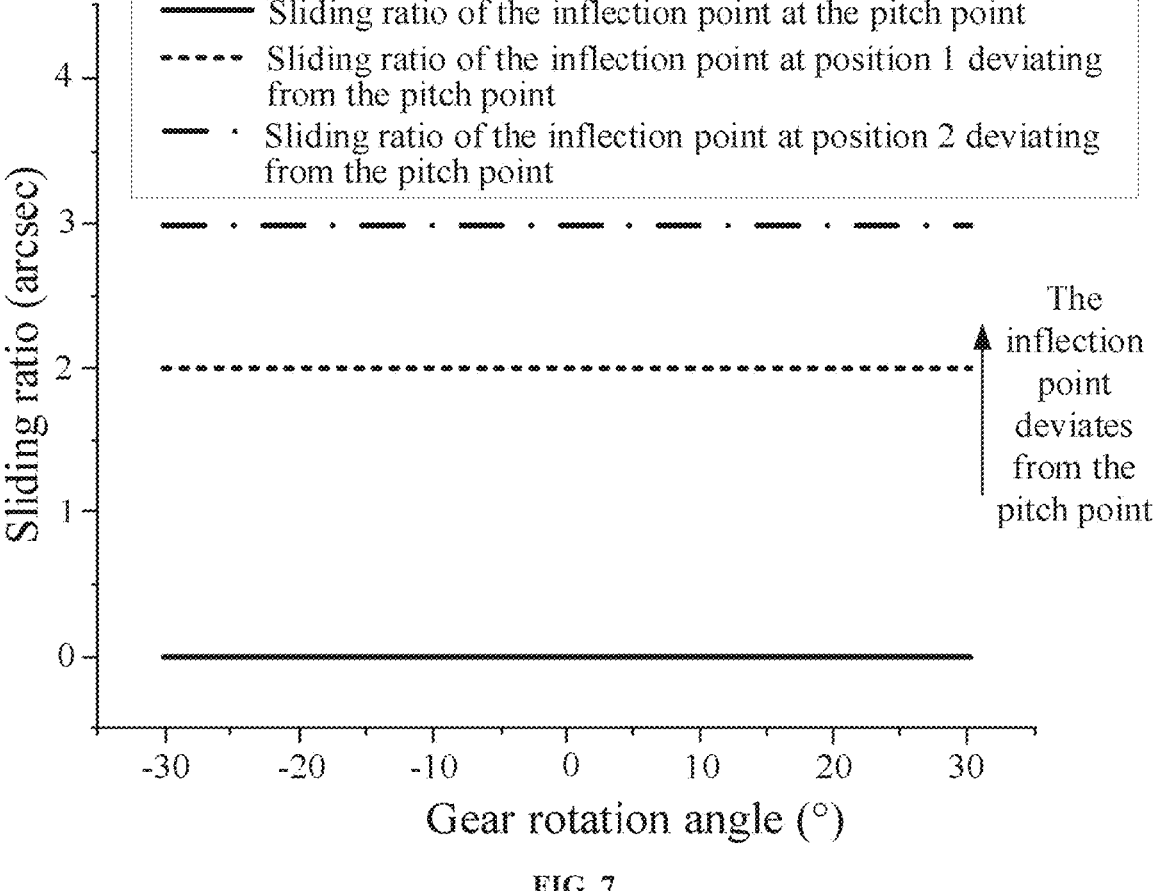
FIG. 7 is a schematic diagram illustrating a sliding ratio at a meshing point of a herringbone gear pair with a constant meshing characteristics constructed tooth pair having a combined curve of an odd power function curve and a tangent at an inflection point thereof as a tooth profile curve according to the present disclosure.

According to the principle of gear meshing, it can be known that there is no relative sliding between tooth surfaces when the herringbone gear pair with a constant meshing characteristics constructed tooth pair meshes at the pitch point. FIG. 7 is a schematic diagram illustrating a sliding ratio at a meshing point of a herringbone gear pair with a constant meshing characteristics constructed tooth pair having a combined curve of an odd power function curve and a tangent at an inflection point thereof as a tooth profile curve according to this embodiment. Since the herringbone gear pair with a constant meshing characteristics constructed tooth pair having the same tooth profile of continuous combined curves meshes at a pitch point at any time in the embodiment, the herringbone gear pair with a constant meshing characteristics constructed tooth pair can achieve zero-sliding meshing. When the inflection point or the tangent point of the combined curve does not coincide with the pitch point, the sliding ratio of the herringbone gear pair with a constant meshing characteristics constructed tooth pair is also constant but is not zero. A closer inflection point or tangent point of the continuous curve to the pitch point indicates a smaller sliding ratio of the herringbone gear pair with a constant meshing characteristics constructed tooth pair, vice versa. When the inflection point or the tangent point coincides with the pitch point, the herringbone gear pair with a constant meshing characteristics constructed tooth pair can achieve zero-sliding meshing transmission, which reduces the wear between tooth surfaces and improves the transmission efficiency of the herringbone gear pair with a constant meshing characteristics constructed tooth pair.

Further, when a contact ratio of the herringbone gear pair with a constant meshing characteristics constructed tooth pair in the embodiment is designed as an integer, the meshing stiffness is constant. At this time, a magnitude of a meshing force of the herringbone gear pair at any meshing position is determined, and a position and a direction of the meshing force at any time are also determined. Therefore, the herringbone gear pair with a constructed tooth pair has a constant meshing state at any time, which effectively ensures stability of dynamic meshing performance of the herringbone gear pair with a constructed tooth pair and can effectively reduce vibration noise of the gear pair with a constructed tooth pair.

Figure 8:
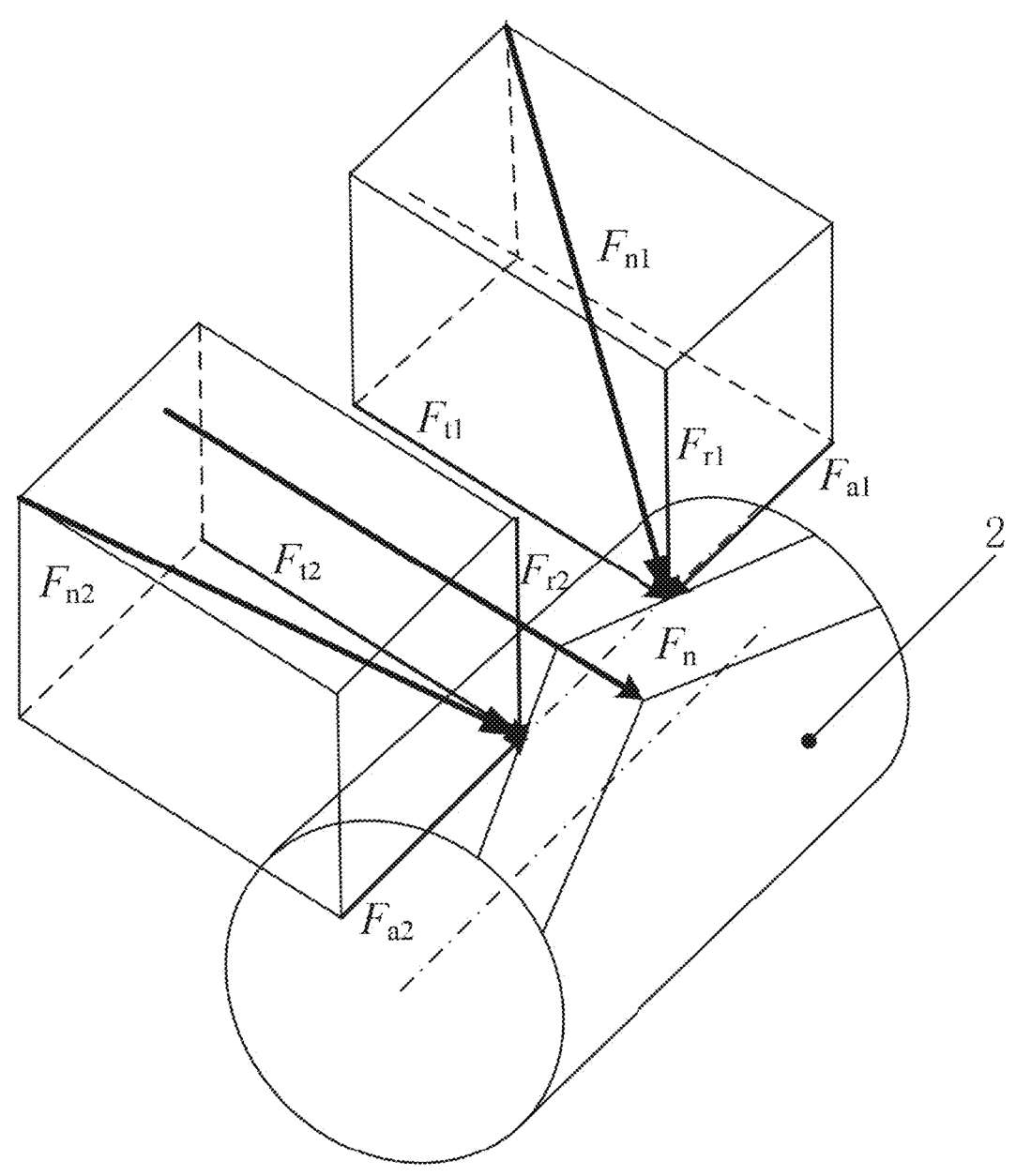
FIG. 8 is a schematic diagram illustrating a meshing force of a herringbone gear pair with a constant meshing characteristics constructed tooth pair according to the present disclosure.

A schematic diagram illustrating a meshing force of a herringbone gear pair is established with the herringbone gear pair with a constant meshing characteristics constructed tooth pair in the embodiment as an example, as shown in FIG. 8. For a right side of the herringbone gear pair with a constant meshing characteristics constructed tooth pair, a meshing force $F_{n1}$ on a herringbone gear with a constructed tooth pair may be decomposed into an axial force $F_{a1}$, a radial force $F_{r1}$, and a circumferential force $F_{t1}$. For a left side of the herringbone gear pair with a constructed tooth pair, a meshing force $F_{n2}$ on the herringbone gear with a constructed tooth pair may be decomposed into an axial force $F_{a2}$, a radial force $F_{r2}$, and a circumferential force $F_{t2}$. When only the right side of the herringbone gear pair is considered, during meshing, with the movement of the meshing point in a tooth width direction, the meshing force $F_{n1}$ also translates in the tooth width direction, and a change in stress state leads to a periodic change in excitation factors of the herringbone gear pair, which seriously affects dynamic meshing performance of the herringbone gear pair. When two sides of the herringbone gear pair with a constructed tooth pair are both considered, since left and right side teeth are completely symmetrical, the axial forces $F_{a1}$ and $F_{a2}$ on tooth surfaces of the two sides cancel out each other, the radial forces $F_{r1}$ and $F_{r2}$ on the two sides are simplified to a central position of the herringbone gear with a constructed tooth pair in the tooth width direction, and the circumferential forces $F_{t1}$ and $F_{t2}$ on the two sides are also simplified to the central position of the herringbone gear with a constructed tooth pair in the tooth width direction. Therefore, a position and a direction of an action line of a combined force $F_n$ of the meshing forces $F_{n1}$ and $F_{n2}$ are determined at any time, which improves stability of the herringbone gear pair with a constant meshing characteristics constructed tooth pair during meshing.

Specific examples are used in this description to illustrate the principles and implementations of the present disclosure. The description of the above embodiments is merely used to help understand the method and its core ideas of the present disclosure. In addition, those of ordinary skill in the art can make changes in terms of specific implementations and the application scope according to the ideas of the present disclosure. In conclusion, the content of this description shall not be construed as a limitation to the present disclosure.

What is claimed is:

1. A herringbone gear pair with a constant meshing characteristics constructed tooth pair, comprising a herringbone gear I with a constructed tooth pair based on conjugate curves and a herringbone gear II with a constructed tooth pair based on conjugate curves, wherein a normal tooth profile curve $\Gamma_{s1}$ of the herringbone gear I with a constructed tooth pair and a normal tooth profile curve $\Gamma_{s2}$ of the herringbone gear II with a constructed tooth pair are continuous combined curves $\Gamma_L$ with the same curve shape; the continuous combined curve is formed by two continuous curves, a connection point of the two continuous curves is an inflection point or a tangent point of the continuous combined curve, and a common normal at the inflection point or the tangent point of the continuous combined curve passes through a pitch point of the herringbone gear pair; and the normal tooth profile curves are swept along given conjugate curves to obtain tooth surfaces of the herringbone gear I with a constructed tooth pair and the herringbone gear II with a constructed tooth pair;

wherein when the continuous combined curve $\Gamma_L$ is a combined curve $\Gamma_{L1}$ of an odd power function curve and a tangent at an inflection point thereof, the continuous combined curve $\Gamma_L$ is formed by an odd power function curve $\Gamma_{L12}$ and a tangent $\Gamma_{L11}$ at an inflection point of the odd power function curve; a rectangular coordinate system is established at the tangent point of the continuous combined curve, and an equation of the combined curve $\Gamma_{L1}$ of the odd power function curve and the tangent at the inflection point thereof is as follows:

$$\begin{cases} \Gamma_{L11}: x_{10} = t, \ y_{10} = 0 & (t_1 \leq t < 0) \\ \Gamma_{L12}: x_{10} = t, \ y_{10} = At^{2n-1} & (0 \leq t \leq t_2) \end{cases},$$

wherein $x_{10}$ and $y_{10}$ are x-axis and y-axis coordinate values of the combined curve in the rectangular coordinate system, respectively; a parameter t is an independent variable of the equation; $t_1$ and $t_2$ are value ranges of the continuous curve; A is a coefficient of the equation; and n is a degree of the independent variable and is a positive integer.

2. The herringbone gear pair with a constant meshing characteristics constructed tooth pair according to claim 1, wherein a curve equation of the normal tooth profile curve $\Gamma_{s1}$ of the herringbone gear I with a constructed tooth pair obtained by rotating the continuous combined curve $\Gamma_L$ around an origin of the rectangular coordinate system by an angle $\alpha_1$ is as follows:

$$\begin{cases} x_{01} = x_{n0} \cos \alpha_1 - y_{n0} \sin \alpha_1 \\ y_{01} = x_{n0} \sin \alpha_1 + y_{n0} \cos \alpha_1 \end{cases} (n = 1, 2, 3, 4, 5, 6),$$

wherein $x_{01}$ and $y_{01}$ are x-axis and y-axis coordinate values of the normal tooth profile curve of the herringbone gear I with a constructed tooth pair in the rectangular coordinate system, respectively.

3. The herringbone gear pair with a constant meshing characteristics constructed tooth pair according to claim 2, wherein a curve equation of the normal tooth profile curve $\Gamma_{s2}$ of the herringbone gear II with a constructed tooth pair obtained by rotating the normal tooth profile curve $\Gamma_{s1}$ of the herringbone gear I with a constructed tooth pair around the origin of the rectangular coordinate system by an angle of 180° is as follows:

$$\begin{cases} x_{02} = x_{01}\cos(180°) - y_{01}\sin(180°) \\ y_{02} = x_{01}\sin(180°) + y_{01}\cos(180°) \end{cases},$$

wherein $x_{02}$ and $y_{02}$ are x-axis and y-axis coordinate values of the normal tooth profile curve of the herringbone gear II with a constructed tooth pair in the rectangular coordinate system, respectively.

4. The herringbone gear pair with a constant meshing characteristics constructed tooth pair according to claim 2, wherein a tooth surface $\Sigma_2$ of the herringbone gear II with a constructed tooth pair is obtained by sweeping the normal tooth profile curve $\Gamma_{s2}$ of the herringbone gear II with a constructed tooth pair along a given helix, with a tooth surface equation as follows:

$$\begin{cases} x_{\Sigma2} = x_{02}\cos\theta - y_{02}\cos\beta\sin\theta + (a-r)\cos\theta \\ y_{\Sigma2} = x_{02}\sin\theta + y_{02}\cos\beta\cos\theta + (a-r)\sin\theta \\ z_{\Sigma2} = \pm(r\theta\cot\beta - y_{02}\sin\beta) \end{cases},$$

wherein $x_{\Sigma2}$, $y_{\Sigma2}$ and $z_{\Sigma2}$ are coordinate values of the tooth surface of the herringbone gear II with a constructed tooth pair, respectively; r is a pitch radius of the herringbone gear pair with a constant meshing characteristics constructed tooth pair, and $\theta$ is an angle of a given contact line; in the sign "±", the sign "+" indicates a left tooth surface of the herringbone gear with a constructed tooth pair, and the sign "−" indicates a right tooth surface of the herringbone gear with a constructed tooth pair.

5. The herringbone gear pair with a constant meshing characteristics constructed tooth pair according to claim 1, wherein a tooth surface $\Sigma_1$ of the herringbone gear I with a constructed tooth pair is obtained by sweeping the normal tooth profile curve $\Gamma_{s1}$ of the herringbone gear I with a constructed tooth pair along a given helix, with a tooth surface equation as follows:

$$\begin{cases} x_{\Sigma1} = x_{01} + m\tan\beta \\ y_1 = y_{01} \qquad (m_1 \leq m \leq m_2), \\ z_{\Sigma1} = \pm m \end{cases}$$

wherein $x_{\Sigma1}$, $y_{\Sigma1}$ and $z_{\Sigma1}$ are coordinate values of the tooth surface of the herringbone gear I with a constructed tooth pair, respectively; $\beta$ is a helix angle of the gear pair, a parameter m is an independent variable of the equation, and $m_1$ and $m_2$ are value ranges of a tooth width; in the sign "±", the sign "+" indicates a left tooth surface of the herringbone gear with a constructed tooth pair, and the sign "−" indicates a right tooth surface of the herringbone gear with a constructed tooth pair.

6. The herringbone gear pair with a constant meshing characteristics constructed tooth pair according to claim 1, wherein a contact ratio of the herringbone gear pair with a constant meshing characteristics constructed tooth pair is designed as an integer, thereby achieving meshing transmission with a constant stiffness.

7. The herringbone gear pair with a constant meshing characteristics constructed tooth pair according to claim 1, wherein the herringbone gear I with a constructed tooth pair and the herringbone gear II with a constructed tooth pair are designed to be symmetrical along the tooth width, thereby achieving a constant meshing force action line of the herringbone gear pair.

* * * * *